United States Patent
Lavanchy (10) Patent No.: US 11,330,835 B2
(45) Date of Patent: May 17, 2022

(54) AEROSOL-GENERATING ARTICLE COMPRISING A THERMAL INDICATOR

(71) Applicant: Philip Morris Products S.A., Neuchatel (CH)

(72) Inventor: Frederic Lavanchy, Chavornay (CH)

(73) Assignee: Philip Morris Products S.A., Neuchatel (CH)

(*) Notice: Subject to any disclaimer, the term of this patent is extended or adjusted under 35 U.S.C. 154(b) by 543 days.

(21) Appl. No.: 16/066,091

(22) PCT Filed: Dec. 29, 2016

(86) PCT No.: PCT/EP2016/082836
§ 371 (c)(1),
(2) Date: Jun. 26, 2018

(87) PCT Pub. No.: WO2017/114895
PCT Pub. Date: Jul. 6, 2017

(65) Prior Publication Data
US 2020/0268039 A1    Aug. 27, 2020

(30) Foreign Application Priority Data

Dec. 31, 2015  (EP) ..................... 15203266

(51) Int. Cl.
*A24D 1/02*    (2006.01)
*A24D 1/22*    (2020.01)
(Continued)

(52) U.S. Cl.
CPC .............. *A24D 1/02* (2013.01); *A24D 1/002* (2013.01); *A24D 1/22* (2020.01); *C09B 9/00* (2013.01); *G01K 11/12* (2013.01)

(58) Field of Classification Search
CPC .. A24F 42/10; A24D 1/22; A24D 1/02; A24D 1/002
See application file for complete search history.

(56) References Cited

U.S. PATENT DOCUMENTS 4,854,332 A    8/1989  Hanakura
5,154,192 A    10/1992 Sprinkel et al.
(Continued)

FOREIGN PATENT DOCUMENTS

CN        1280920 A     1/2001
CN      103233397 A     8/2013
(Continued)

OTHER PUBLICATIONS

Machine translation of CN203618776 (Year: 2020).*
(Continued)

*Primary Examiner* — Eric Yaary
*Assistant Examiner* — Jennifer A Kessie
(74) *Attorney, Agent, or Firm* — Oblon, McClelland, Maier & Neustadt, L.L.P.

(57) ABSTRACT

An aerosol generating article is provided, including a combustible carbonaceous heat source; an aerosol-forming substrate; and a thermal indicator provided on an outer surface of the aerosol-generating article downstream of the combustible carbonaceous heat source. The thermal indicator includes at least one reversible thermochromic material that undergoes a first reversible visible colour change when a temperature of the thermal indicator rises to a first switching temperature and a second reversible visible colour change when a temperature of the thermal indicator falls to a second switching temperature. The first switching temperature is below about 80° C. and the second switching temperature is lower than or equal to the first switching temperature.

12 Claims, 1 Drawing Sheet

(51) Int. Cl.
　　　 *A24D 1/00* 　　　　(2020.01)
　　　 *C09B 9/00* 　　　　(2006.01)
　　　 *G01K 11/12* 　　　　(2021.01)

(56) References Cited

U.S. PATENT DOCUMENTS

| | | |
|---|---|---|
| 2007/0215168 A1 | 9/2007 | Banerjee et al. |
| 2015/0201670 A1 | 7/2015 | Crooks et al. |
| 2015/0223520 A1 | 8/2015 | Phillips et al. |

FOREIGN PATENT DOCUMENTS

| | | |
|---|---|---|
| CN | 203618776 U | 6/2014 |
| CN | 203841121 U | 9/2014 |
| EP | 0409566 A1 | 1/1991 |
| EP | 2798968 A1 | 11/2014 |
| FR | 2 176 423 A5 | 10/1973 |
| JP | 53-128586 A | 11/1978 |
| WO | WO 2008/015441 A1 | 2/2008 |
| WO | WO 2009/022232 A2 | 2/2009 |
| WO | WO 2009/092862 A1 | 7/2009 |
| WO | WO 2012/164077 A1 | 12/2012 |
| WO | WO 2014/045024 A2 | 3/2014 |

OTHER PUBLICATIONS

Combined Chinese Office Action and Search Report dated Jul. 2, 2020, in Patent Application No. 201680071549.7 (with English translation), citing documents AO-AR therein, 20 pages.
International Search Report and Written Opinion dated Mar. 27, 2017, in PCT/EP2016/082836, filed Dec. 29, 2016.

\* cited by examiner

AEROSOL-GENERATING ARTICLE COMPRISING A THERMAL INDICATOR

The present invention relates to aerosol-generating articles having a thermal indicator. In particular, the present invention relates to aerosol generating articles comprising a combustible carbonaceous heat source, an aerosol-forming substrate and a thermal indicator provided on the outer surface thereof.

A number of smoking articles in which tobacco is heated rather than combusted have been proposed in the art. An aim of such 'heated' smoking articles is to reduce known harmful smoke constituents of the type produced by the combustion and pyrolytic degradation of tobacco in conventional cigarettes. In one known type of heated smoking article, an aerosol is generated by the transfer of heat from a combustible carbonaceous heat source to a physically separate aerosol-forming substrate. The aerosol-forming substrate may be located within, around or downstream of the combustible carbonaceous heat source. During smoking, volatile compounds are released from the aerosol-forming substrate by heat transfer from the combustible carbonaceous heat source and entrained in air drawn through the smoking article. As the released compounds cool, they condense to form an aerosol that is inhaled by the user.

For example, WO-A2-2009/022232 discloses a smoking article comprising a combustible carbonaceous heat source, an aerosol-forming substrate downstream of the combustible carbonaceous heat source, and a heat-conducting element around and in direct contact with a rear portion of the combustible carbonaceous heat source and an adjacent front portion of the aerosol-forming substrate.

The combustible carbonaceous heat source of aerosol-generating articles of the type disclosed in WO-A2-2009/022232 may remain very hot after being extinguished. After using an aerosol-generating article source comprising a combustible carbonaceous heat source, a user may not be able to tell when the combustible carbonaceous heat source is extinguished.

It would be desirable to provide an aerosol-generating article source comprising a combustible carbonaceous heat source that provides a visual sign to a user of when the combustible carbonaceous heat source is extinguished and sufficiently cool for the aerosol-generating article to be disposed of.

According to the invention there is provided an aerosol generating article comprising: a combustible carbonaceous heat source; an aerosol-forming substrate; and a thermal indicator provided on an outer surface of the aerosol-generating article downstream of the combustible carbonaceous heat source, wherein the thermal indicator comprises at least one reversible thermochromic material that undergoes a first reversible visible colour change when the temperature of the thermal indicator rises to a first switching temperature and a second reversible visible colour change when the temperature of the thermal indicator falls to a second switching temperature, wherein the second switching temperature is lower than or equal to the first switching temperature.

Advantageously, according to the invention there is provided an aerosol generating article comprising: a combustible carbonaceous heat source; an aerosol-forming substrate; and a thermal indicator provided on an outer surface of the aerosol-generating article downstream of the combustible carbonaceous heat source, wherein the thermal indicator comprises at least one reversible thermochromic material that undergoes a first reversible visible colour change when the temperature of the thermal indicator rises to a first switching temperature and a second reversible visible colour change when the temperature of the thermal indicator falls to a second switching temperature, wherein the first switching temperature is below about 80° C. and the second switching temperature is lower than or equal to the first switching temperature.

As described further below, the second reversible visible colour change of the at least one reversible thermochromic material advantageously provides a visual indication to a user of when the combustible carbonaceous heat source of the aerosol-generating article is sufficiently cool for the aerosol-generating article to be disposed of.

Advantageously, the position of the thermal indicator and the second switching temperature are such that, in use, the second reversible visible colour change of the at least one reversible thermochromic material provides a visual indication to a user that the temperature of the front end face of the combustible carbonaceous heat source is below the ignition temperature of, for example, paper and other similar combustible materials.

Advantageously, the position of the thermal indicator and the second switching temperature are such that, in use, the second reversible visible colour change of the at least one reversible thermochromic material provides a visual indication to a user that the temperature of the front end face of the combustible carbonaceous heat source is below about 300° C.

Unless otherwise stated, the temperatures of the front end face of the combustible carbonaceous heat source provided herein are surface temperatures measured using an infrared (IR) camera. The temperature of the front end face of the combustible carbonaceous heat source may alternatively be measured using a thermocouple in contact with the front end face of the combustible carbonaceous heat source.

According to the invention there is also provided a method of visually indicating to a user that an aerosol-generating article comprising a combustible carbonaceous heat source and an aerosol-forming substrate is ready to be disposed of after use, the method comprising: providing a thermal indicator on an outer surface of the aerosol-generating article downstream of the combustible carbonaceous heat source, wherein the thermal indicator comprises at least one reversible thermochromic material that undergoes a first reversible visible colour change when the temperature of the thermal indicator rises to a first switching temperature and a second reversible visible colour change when the temperature of the thermal indicator falls to a second switching temperature, wherein the first switching temperature is below about 80° C. and the second switching temperature is lower than or equal to the first switching temperature, wherein the position of the thermal indicator and the second switching temperature are such that, in use, the second reversible visible colour change of the at least one reversible thermochromic material provides a visual indication to a user that the temperature of the front end face of the combustible carbonaceous heat source is below about 300° C.

Advantageously, the position of the thermal indicator and the second switching temperature may be such that, in use, the second reversible visible colour change of the at least one reversible thermochromic material provides a visual indication to a user that the temperature of the front end face of the combustible carbonaceous heat source is below about 250° C.

The position of the thermal indicator and the second switching temperature may be such that, in use, the second reversible visible colour change of the at least one reversible thermochromic material provides a visual indication to a user that the temperature of the front end face of the combustible carbonaceous heat source is below about 200° C.

The position of the thermal indicator and the second switching temperature may be such that, in use, the second reversible visible colour change of the at least one reversible thermochromic material provides a visual indication to a user that the temperature of the front end face of the combustible carbonaceous heat source is below about 150° C.

The position of the thermal indicator and the second switching temperature may be such that, in use, the second reversible visible colour change of the at least one reversible thermochromic material provides a visual indication to a user that the temperature of the front end face of the combustible carbonaceous heat source is below about 100° C.

Advantageously, the position of the thermal indicator and the second switching temperature may be such that, in use, the second reversible visible colour change of the at least one reversible thermochromic material provides a visual indication to a user that the temperature of the front end face of the combustible carbonaceous heat source is below about 50° C.

As used herein with reference to the invention, the term "carbonaceous" is used to describe combustible carbonaceous heat sources comprising carbon.

As used herein with reference to the invention, the term "aerosol-forming substrate" is used to describe a substrate capable of releasing upon heating volatile compounds, which can form an aerosol. The aerosols generated from aerosol-forming substrates of aerosol-generating articles according to the invention may be visible or invisible and may include vapours (for example, fine particles of substances, which are in a gaseous state, that are ordinarily liquid or solid at room temperature) as well as gases and liquid droplets of condensed vapours.

The aerosol-forming substrate may be in the form of a plug or segment comprising a material capable of releasing upon heating volatile compounds, which can form an aerosol, circumscribed by an outer wrapper. Where an aerosol-forming substrate is in the form of such a plug or segment, the entire plug or segment including the outer wrapper is considered to be the aerosol-forming substrate.

As used herein with reference to the invention, the terms "distal", "upstream" and "front", and "proximal", "downstream" and "rear", are used to describe the relative positions of components, or portions of components, of the aerosol-generating article. Aerosol-generating articles according to the invention comprise a proximal end through which, in use, an aerosol exits the aerosol-generating article for delivery to a user. In use, a user draws on the proximal end of the aerosol-generating article in order to inhale an aerosol generated by the aerosol-generating article.

The combustible carbonaceous heat source is located at or proximate to the distal end of the aerosol-generating article. The proximal end of the aerosol-generating article is downstream of the distal end of the aerosol-generating article. The proximal end of the aerosol-generating article may also be referred to as the downstream end of the aerosol-generating article and the distal end of the aerosol-generating article may also be referred to as the upstream end of the aerosol-generating article. Components, or portions of components, of aerosol-generating articles according to the invention may be described as being upstream or downstream of one another based on their relative positions between the proximal end of the aerosol-generating article and the distal end of the aerosol-generating article.

The combustible carbonaceous heat source has a front end face and an opposed rear end face. The front end face of the combustible carbonaceous heat source is at the upstream end of the combustible carbonaceous heat source. The upstream end of the combustible carbonaceous heat source is the end of the combustible carbonaceous heat source furthest from the proximal end of the aerosol-generating article. The rear end face of the combustible carbonaceous heat source is at the downstream end of the combustible carbonaceous heat source. The downstream end of the combustible carbonaceous heat source is the end of the combustible carbonaceous heat source closest to the proximal end of the aerosol-generating article.

As used herein with reference to the invention, the term "longitudinal" is used to describe the direction between the proximal end and the opposed distal end of the aerosol-generating article.

As used herein, the term "transverse" is used to describe the direction perpendicular to the longitudinal direction.

As used herein with reference to the invention, the term "length" is used to describe the maximum dimension of components of the aerosol-generating article in the longitudinal direction of the aerosol-generating article.

As used herein with reference to the invention, the term "width" is used to describe the maximum dimension of components of the aerosol-generating article in the transverse direction of the smoking article.

As used herein with reference to the invention, the terms "inner surface" and "outer surface" are used to describe the transversely innermost surface and transversely outermost surface, respectively, of components of the aerosol-generating article.

As used herein with reference to the invention, the term "thermochromic material" is used to describe any material that undergoes a visible colour change at a predetermined switching temperature.

Thermochromic materials may undergo a visible colour change as the temperature rises or falls over a transition range. As used herein with reference to the invention, the term "switching temperature" is used to describe the temperature at which the visible colour change of a thermochromic material is complete. The switching temperature may be determined by measuring the colour intensity of the thermochromic material.

Aerosol-generating articles according to the invention may have a thermal indicator comprising one or more reversible thermochromic materials that undergo a rapid or instantaneous reversible visible colour change over a narrow transition range. Alternatively or in addition, the thermal indicator may comprise one or more reversible thermochromic materials that undergo a gradual reversible visible colour change over a broad transition range.

Advantageously, the first switching temperature is between about 30° C. and about 80° C. For example, the first switching temperature may be between about 35° C. and about 80° C., between about 40° C. and about 80° C. or between about 45° C. and about 80° C.

Advantageously, the first switching temperature may be below about 70° C.

Advantageously, the first switching temperature may be between about 30° C. and about 70° C. For example, the first switching temperature may be between about 35° C. and about 70° C., between about 40° C. and about 70° C. or between about 45° C. and about 70° C.

Advantageously, the first switching temperature is below about 60° C.

Advantageously, the first switching temperature is between about 30° C. and about 60° C. For example, the first switching temperature may be between about 35° C. and about 60° C., between about 40° C. and about 60° C. or between about 45° C. and about 60° C.

Advantageously, the first switching temperature may be below about 50° C.

Advantageously, the first switching temperature may be between about 30° C. and about 50° C. For example, the first switching temperature may be between about 35° C. and about 50° C., between about 40° C. and about 50° C. or between about 45° C. and about 50° C.

Advantageously, the second switching temperature is lower than the first switching temperature. In such embodiments, the at least one reversible thermochromic material undergoes a first reversible colour change upon heating at a first switching temperature that is greater than the second switching temperature at which the at least one reversible thermochromic material undergoes a second reversible colour change upon cooling. Such reversible thermochromic materials are referred to herein as exhibiting thermal hysteresis.

As described further below, providing a thermal indicator comprising at least one reversible thermochromic material that exhibits thermal hysteresis advantageously provides a 'buffer' that helps to ensure that the thermal indicator provides a visual indication to a user of when the combustible heat is sufficiently cool for the aerosol-generating article to be disposed of.

As described further below, providing a thermal indicator comprising at least one reversible thermochromic material that exhibits thermal hysteresis allows the thermal indicator to be positioned further downstream from the combustible carbonaceous heat source than a thermal indicator comprising at least one reversible thermochromic material that does not exhibit thermal hysteresis. This may advantageously reduce the risk of volatile components being released from the at least one reversible thermochromic material due to thermal degradation or decomposition thereof.

Advantageously, the second switching temperature is between about 3° C. and about 15° C. lower than the first switching temperature.

Advantageously, the second switching temperature may be between about 3° C. and about 12° C. lower than the first switching temperature.

The second switching temperature may be between about 3° C. and about 10° C. lower than the first switching temperature.

The second switching temperature may be between about 5° C. and about 8° C. lower than the first switching temperature.

The thermal indicator may comprise at least one reversible thermochromic material that undergoes a first reversible visible colour change from a first coloured state to a second coloured state when the temperature of the thermal indicator rises to the first switching temperature and a second reversible visible colour change from the second coloured state to the first coloured state when the temperature of the thermal indicator falls to the second switching temperature.

Advantageously, the thermal indicator comprises at least one reversible thermochromic material that undergoes a first reversible visible colour change from a first coloured state to a substantially colourless state when the temperature of the thermal indicator rises to the first switching temperature and a second reversible visible colour change from the substantially colourless state to the first coloured state when the temperature of the thermal indicator falls to the second switching temperature.

In such embodiments, the first switching temperature may be referred to as the 'disappearance' temperature of the at least one reversible thermochromic material and the second switching temperature may be referred to as the 'appearance' temperature of the at least one reversible thermochromic material.

For example, the thermal indicator may comprise one or more indicia formed from a reversible thermochromic material that undergoes a first reversible visible colour change from blue to substantially colourless when the temperature of the thermal indicator rises to the first switching temperature and a second reversible visible colour change from substantially colourless to blue when the temperature of the thermal indicator falls to the second switching temperature. At the first switching temperature, the one or more indicia 'disappear' (substantially colourless thermochromic material=substantially colourless indicia). However, at the second switching temperature, the one or more indicia 'reappear' (blue thermochromic material=blue indicia).

The thermal indicator may include any suitable reversible thermochromic material. For example, the thermal indicator may comprise one or more materials selected from the group consisting of reversible thermochromic liquid crystals, reversible thermochromic inorganic materials (for example, metal complexes), reversible thermochromic organic materials (for example, leuco dyes) and combinations thereof.

Suitable liquid crystals include, but are not limited to, cholesteryl esters (for example, cholesteryl nonanoate) and cyanobiphenyls. Suitable leuco dyes include, but are not limited to, spirolactones (for example, fluorans and crystal violet lactone), spiropyran, and fulgides.

Advantageously, the thermal indicator comprises at least one leuco dye that that undergoes a first reversible visible colour change when the temperature of the thermal indicator rises to the first switching temperature and a second reversible visible colour change when the temperature of the thermal indicator falls to the second switching temperature.

Advantageously, the thermal indicator comprises at least one leuco dye that undergoes a first reversible visible colour change from a first coloured state to a substantially colourless state when the temperature of the thermal indicator rises to the first switching temperature and a second reversible visible colour change from the substantially colourless state to the first coloured state when the temperature of the thermal indicator falls to the second switching temperature.

The thermal indicator may comprise one or more microencapsulated reversible thermochromic materials.

For example, the thermal indicator may comprise a microencapsulated reversible thermochromic material comprising a leuco dye, a color developer (proton-donor) and a polar solvent. Suitable colour developers include, but are not limited to, weak acids such as, for example, bisphenol A, 1,2,3 triazoles (for example, 1,2,3-benzotriazole and 1,2,3-triazole ethyl 4-methyl-5-carboxylate), octyl p-hydroxybenzoate, methyl p-hydroxybenzoate and 4-hydroxycoumarin derivatives. Suitable polar solvents include, but are not limited to, alcohols (for example, lauryl alcohol and cetyl alcohol), esters (for example, butyl stearate), ketones or ethers. The reversible thermochromic material may contain a leuco dye and a weak acid that acts as both a colour developer (proton donor) and a solvent. In use, the colour developer imparts the reversible colour change to the reversible thermochromic mixture while the melting point of the polar solvent controls the switching temperature at which the reversible visible colour change takes places.

Reversible thermochromic materials suitable for use in the thermal indicator are commercially available in a variety of formulations including, but not limited to, powders, inks, paints and other coating compositions. Micro-encapsulated leuco dyes suitable for use in the thermal indicator of aerosol-generating articles according to the invention are commercially available under the brand name Live colors from Gem'innov in Gemenos, France and under the brand names ChromaZone® and Thermostar® from Thermographic Measurements Ltd in Honiton, Devon, England. Other suppliers of thermochromic inks suitable for use in the thermal indicator of aerosol-generating articles according to the invention include, but are not limited to, Chromatic Technologies Inc. in Colorado Springs, Colo., United States of America, International Ink Company in Gainesville, Ga., United States of America, Chemsong, Inc. in Glen Ellyn, Ill., United States of America and LCR Hallcrest and B&H Colour Change in Connah's Quay Flintshire, Wales.

Advantageously, the at least one reversible thermochromic material comprises one or more thermochromic dyes, one or more thermochromic pigments or a combination thereof dispersed in a liquid carrier or vehicle. Particularly advantageously, the thermal indicator comprises at least one thermochromic ink.

Reversible thermochromic materials that undergo reversible visible colour changes from a variety of different first coloured states to a variety of different second coloured states when heated to a predetermined switching temperature are known in the art.

Reversible thermochromic materials that undergo reversible visible colour changes from a variety of different first coloured states to substantially colourless states upon heating to a predetermined switching temperature are known in the art. For example, reversible thermochromic materials comprising leuco dyes that undergo reversible visible colour changes from red to substantially colourless, yellow to substantially colourless, green to substantially colourless and blue to substantially colourless upon heating to a predetermined switching temperature are known.

The thermal indicator may comprise two or more reversible thermochromic materials that, upon heating to the same or different predetermined switching temperatures, undergo reversible visible colour changes from the same or different first coloured states to substantially colourless states.

In such embodiments, at least one of the reversible thermochromic materials undergoes a first reversible visible colour change when the temperature of the thermal indicator rises to a first switching temperature and a second reversible visible colour change when the temperature of the thermal indicator falls to a second switching temperature, wherein the first switching temperature is below about 60° C. and the second switching temperature is lower than or equal to the first switching temperature.

For example, the thermal indicator may comprise a first reversible thermochromic material that undergoes a first reversible visible colour change from blue to substantially colourless upon heating to the first switching temperature and a second reversible thermochromic material that undergoes a first reversible visible colour change from red to substantially colourless upon heating to a predetermined switching temperature. The predetermined switching temperature at which the second reversible thermochromic material undergoes a first reversible visible colour change from red to substantially colourless may be substantially the same as, or lower than, or higher than, the first switching temperature at which the first reversible thermochromic material undergoes a first reversible visible colour change from blue to substantially colourless.

The thermal indicator may comprise two or more reversible thermochromic materials that when heated to the same or different predetermined switching temperatures, undergo first reversible visible colour changes from the same or different first coloured states to the same or different second coloured states.

In addition to at least one reversible thermochromic material, the thermal indicator may further comprise at least one irreversible thermochromic material that undergoes an irreversible visible colour change when the temperature of the thermal indicator rises to a third switching temperature. In such embodiments, the third switching temperature may be the same as or different to the first switching temperature.

For example, the thermal indicator may comprise a first reversible thermochromic material that undergoes a first reversible visible colour change from a first coloured state to a substantially colourless state upon heating to the first switching temperature and a second irreversible thermochromic material that undergoes an irreversible visible colour change from a substantially colourless state to a second coloured state upon heating to a predetermined switching temperature. The predetermined switching temperature at which the second irreversible thermochromic material undergoes a irreversible visible colour change from a substantially colourless state to a second coloured state may be substantially the same as, or lower than, or higher than, the first switching temperature at which the first reversible thermochromic material undergoes a first reversible visible colour change from a first coloured state to a substantially colourless state.

The thermal indicator may comprise at least one irreversible thermochromic material that undergoes an irreversible third visible colour change from a substantially colourless state to a third coloured state when the temperature of the thermal indicator rises to a third switching temperature. As the third visible colour change is irreversible, in such embodiments the at least one irreversible thermochromic material does not undergo a visible colour change back to the substantially colourless state from the third coloured state when the temperature of the thermal indicator subsequently falls to the second switching temperature.

The thermal indicator may comprise at least one irreversible thermochromic material that undergoes an irreversible third visible colour change from a third coloured state to a fourth coloured state when the temperature of the thermal indicator rises to a third switching temperature. As the third visible colour change is irreversible, in such embodiments the at least one irreversible thermochromic material does not undergo a visible colour change back to the third colour state colourless state from the fourth coloured state when the temperature of the thermal indicator subsequently falls to the second switching temperature.

The thermal indicator may comprise two or more irreversible thermochromic materials that when heated to the same or different predetermined switching temperatures, undergo irreversible visible colour changes from the same or different third coloured states to substantially colourless states.

The thermal indicator may comprise two or more irreversible thermochromic materials that when heated to the same or different predetermined switching temperatures, undergo irreversible visible colour changes from the same or different third coloured states to the same or different fourth coloured states.

It will be appreciated that where the thermal indicator comprises two or more thermochromic materials, the two or more thermochromic materials may be present in the thermal indicator in the same or different amounts.

For example, where the thermal indicator comprises two or more reversible thermochromic materials, the two or more reversible thermochromic materials may be present in the thermal indicator in the same or different amounts. Similarly, where the thermal indicator comprises one or more reversible thermochromic materials and one or more irreversible thermochromic materials, the one or more reversible thermochromic materials and the one or more irreversible thermochromic materials may be present in the thermal indicator in the same or different amounts.

The thermal indicator may be formed by applying or affixing the at least one reversible thermochromic material to the outer surface of the aerosol-generating article in a suitable manner. For example, the at least one reversible thermochromic material may be adhered, brushed, coated, stamped or otherwise applied or affixed to the outer surface of the aerosol-generating article.

The thermal indicator may be formed by applying or affixing the at least one reversible thermochromic material to an outer wrapper of the aerosol-generating article.

The thermal indicator may be formed by directly applying or directly affixing the at least one reversible thermochromic material to an outer wrapper of the aerosol-generating article.

The thermal indicator may be formed by applying or affixing the at least one reversible thermochromic material to a band of paper or other material circumscribing an outer wrapper of the aerosol-generating article. In such embodiments, the at least one thermochromic material may be directly applied or directly affixed to the outer wrapper of the aerosol-generating article before or after assembly of the aerosol-generating article.

Advantageously, the at least one reversible thermochromic material is printed onto the outer surface of the aerosol-generating article. Particularly advantageously, the thermal indicator is formed by inkjet, offset, screen, gravure or flexographic printing the at least one reversible thermochromic material onto an outer wrapper of the aerosol-generating article or a band of paper or other material circumscribing an outer wrapper of the aerosol-generating article.

The thermal indicator may comprise one or more indicia including, but not limited to, shapes (for example, dots, lines, rings, circles and polygons), text (for example, letters and words), numbers, images (for example, logos and pictures) and combinations thereof. The one or more indicia may be provided on the outer surface of the aerosol-generating article in different patterns and at different longitudinal positions along the length thereof.

In addition to at least one reversible thermochromic material, the thermal indicator may further comprise at least one non-thermochromic coloured material. For example, the thermal indicator may further comprise one or more non-thermochromic dyes, one or more non-thermochromic pigments or a combination thereof.

In such embodiments, the thermal indicator may be formed by applying the at least one reversible thermochromic material and the at least one non-thermochromic coloured material to the outer surface of the aerosol-generating article separately or in combination.

For example, the thermal indicator may comprise one or more indicia formed by applying a mixture of one or more reversible thermochromic pigments or dyes and one or more non-thermochromic pigments or dyes to the outer surface of the aerosol-generating article.

For example, the thermal indicator may comprise one or more indicia formed by applying a base layer of non-thermochromic coloured material to the outer surface of the aerosol-generating article and then applying an outer layer of reversible thermochromic material onto the base layer of non-thermochromic coloured material.

Thermal indicators of aerosol-generating articles according to the invention that include at least one non-thermochromic coloured material, may advantageously provide a visual indication to a user of when the combustible carbonaceous heat source is sufficiently cool for the aerosol-generating article to be disposed of by a reversible visible colour change from a first colour to a second colour.

For example, the thermal indicator may comprise one or more indicia formed from a mixture of: a reversible thermochromic material that undergoes a first reversible visible colour change from blue to substantially colourless when the temperature of the thermal indicator rises to the first switching temperature and a second reversible visible colour change from substantially colourless to blue when the temperature of the thermal indicator falls to the second switching temperature; and a yellow non-thermochromic material. At temperatures above the first switching temperature, the one or more indicia appear yellow (substantially colourless thermochromic material+yellow non-thermochromic material=yellow indicia). However, at temperatures below the second switching temperature, the one or more indicia appear green (blue thermochromic material+yellow non-thermochromic material=green indicia).

For example, the thermal indicator may comprise one or more indicia formed from a red non-thermochromic material that are covered by a layer of a reversible thermochromic material that undergoes a first reversible visible colour change from blue to substantially colourless when the temperature of the thermal indicator rises to the first switching temperature and a second reversible visible colour change from substantially colourless to blue when the temperature of the thermal indicator falls to the second switching temperature. At temperatures above the first switching temperature, the one or more indicia are visible (substantially colourless thermochromic layer+non-thermochromic red indicia=red indicia). However, at temperatures below the second switching temperature, only the blue layer of reversible thermochromic material covering the non-thermochromic red indicia is visible.

It will be appreciated that through an appropriate choice of the at least one reversible thermochromic material and, where present, the irreversible thermochromic materials and the non-thermochromic materials therein, the thermal indicator of aerosol-generating articles according to the invention may advantageously provide one or more desired visual indications to a user at one or more desired temperatures.

Advantageously the second reversible visible colour change of the at least one reversible thermochromic material provides a visual indication to a user of when the combustible carbonaceous heat source of the aerosol-generating article is sufficiently cool for the aerosol-generating article to be disposed of.

For example, as described above, to provide a visual indication to a user of when the aerosol-generating article may be disposed of the thermal indicator may comprise one or more indicia formed from at least one reversible thermochromic material that undergoes a second reversible visible colour change from a substantially colourless state to a first coloured stated when the temperature of the thermal indicator falls to the second switching temperature and that are only visible when the combustible carbonaceous heat source of the aerosol-generating article is sufficiently cool for the aerosol-generating article to be disposed of.

Aerosol-generating articles according to the invention may have thermal indicators provided at different longitudinal positions on the outer surface thereof depending upon the construction and dimensions of the aerosol-generating article.

The thermal indicator may extend longitudinally along the outer surface of the aerosol-generating article. For example, the thermal indicator may comprise a plurality of indicia that are longitudinally spaced apart along the outer surface of the aerosol-generating article or one or more elongate indicia that extend longitudinally along the outer surface of the aerosol-generating article.

The thermal indicator may extend transversely around the outer surface of the aerosol-generating article. For example, the thermal indicator may comprise a plurality of indicia that are transversely spaced apart around the outer surface of the aerosol-generating article or one or more elongate indicia that extend transversely around the outer surface of the aerosol-generating article.

Advantageously, the thermal indicator is at least about 5 millimetres downstream of the combustible carbonaceous heat source.

Advantageously, the thermal indicator may be at least about 10 millimetres downstream of the combustible carbonaceous heat source.

Advantageously, the thermal indicator may be at least about 15 millimetres downstream of the combustible carbonaceous heat source.

Advantageously, the thermal indicator is less than or equal to about 45 millimetres downstream of the combustible carbonaceous heat source.

Advantageously, the thermal indicator is between about 5 millimetres and about 45 millimetres downstream of the combustible carbonaceous heat source.

Advantageously, the thermal indicator may be between about 10 millimetres and about 45 millimetres downstream of the combustible carbonaceous heat source.

Advantageously, the thermal indicator may be between about 15 millimetres and about 45 millimetres downstream of the combustible carbonaceous heat source.

Advantageously, the thermal indicator may be less than or equal to about 40 millimetres downstream of the combustible carbonaceous heat source.

Advantageously, the thermal indicator may be between about 5 millimetres and about 40 millimetres downstream of the combustible carbonaceous heat source.

Advantageously, the thermal indicator may be between about 10 millimetres and about 40 millimetres downstream of the combustible carbonaceous heat source.

Advantageously, the thermal indicator may be between about 15 millimetres and about 40 millimetres downstream of the combustible carbonaceous heat source.

The thermal indicator may be less than or equal to about 35 millimetres downstream of the combustible carbonaceous heat source.

The thermal indicator may be between about 5 millimetres and about 35 millimetres downstream of the combustible carbonaceous heat source.

The thermal indicator may be between about 10 millimetres and about 35 millimetres downstream of the combustible carbonaceous heat source.

The thermal indicator may be between about 15 millimetres and about 35 millimetres downstream of the combustible carbonaceous heat source.

Aerosol-generating articles according to the invention may comprise a non-blind combustible carbonaceous heat source.

As used herein with reference to the invention, the term "non-blind" is used to describe a combustible carbonaceous heat source including at least one airflow channel extending from the front end face to the rear end face of the combustible carbonaceous heat source.

As used herein with reference to the invention, the term "airflow channel" is used to describe a channel extending along the length of a combustible carbonaceous heat source through which air may be drawn for inhalation by a user.

Aerosol-generating articles according to the invention comprising a non-blind combustible carbonaceous heat source may comprise a non-combustible substantially air impermeable barrier between the non-blind combustible carbonaceous heat source and the one or more airflow channels.

The barrier between the non-blind combustible carbonaceous heat source and the one or more airflow channels may be adhered or otherwise affixed to the non-blind combustible carbonaceous heat source.

Advantageously, the barrier comprises a non-combustible substantially air impermeable barrier coating provided on an inner surface of the one or more airflow channels. In such embodiments, advantageously the barrier comprises a barrier coating provided on at least substantially the entire inner surface of the one or more airflow channels. More advantageously, the barrier comprises a barrier coating provided on the entire inner surface of the one or more airflow channels.

Advantageously, smoking articles according to the invention comprise a blind combustible carbonaceous heat source.

As used herein with reference to the invention, the term "blind" is used to describe a combustible carbonaceous heat source that does not include any airflow channels extending from the front end face to the rear end face of the combustible carbonaceous heat source.

As used herein with reference to the invention, the term "blind" is also used to describe a combustible carbonaceous heat source including one or more airflow channels extending from the front end face of the combustible carbonaceous heat source to the rear end face of the combustible carbonaceous heat source, wherein a non-combustible substantially air impermeable barrier between the rear end face of the combustible carbonaceous heat source and the aerosol-forming substrate barrier prevents air from being drawn along the length of the combustible carbonaceous heat source through the one or more airflow channels.

Aerosol-generating articles according to the invention comprising blind combustible heat sources comprise one or more air inlets downstream of the rear end face of the combustible heat source for drawing air into the aerosol-generating article.

Advantageously, the combustible carbonaceous heat source has a carbon content of at least about 35 percent, more preferably of at least about 40 percent, most preferably of at least about 45 percent by dry weight of the combustible carbonaceous heat source.

The combustible carbonaceous heat source may be formed from one or more suitable carbon-containing materials.

One or more binders may be combined with the one or more carbon-containing materials. In such embodiments, the combustible carbonaceous heat source may comprise one or more organic binders, one or more inorganic binders or a combination of one or more organic binders and one or more inorganic binders.

The combustible carbonaceous heat source may comprise one or more additives in order to improve the properties of the combustible carbonaceous heat source. Suitable additives include, but are not limited to, additives to promote consolidation of the combustible carbonaceous heat source (for example, sintering aids), additives to promote ignition of the combustible carbonaceous heat source (for example, oxidisers such as perchlorates, chlorates, nitrates, peroxides, permanganates, zirconium and combinations thereof), additives to promote combustion of the combustible carbonaceous heat source (for example, potassium and potassium salts, such as potassium citrate) and additives to promote decomposition of one or more gases produced by combustion of the combustible carbonaceous heat source (for example catalysts, such as CuO, $Fe_2O_3$ and $Al_2O_3$).

Advantageously, the combustible carbonaceous heat source comprises at least one ignition aid. Advantageously, the combustible carbonaceous heat source may comprise at least one ignition aid as described in WO-A1-2012/164077.

Advantageously, the combustible carbonaceous heat source is formed by a pressing process or an extrusion process. More advantageously, the combustible carbonaceous heat source is formed by a pressing process.

Advantageously, the combustible carbonaceous heat source has a length of between about 7 millimetres and about 17 millimetres, more advantageously of between about 7 millimetres and about 15 millimetres, most advantageously of between about 7 millimetres and about 13 millimetres.

Advantageously, the combustible carbonaceous heat source has a width of between about 5 millimetres and about 9 millimetres, more preferably of between about 7 millimetres and about 8 millimetres.

The aerosol-forming substrate may be located within, around or downstream of the combustible carbonaceous heat source. Advantageously, the aerosol-forming substrate is downstream of the combustible carbonaceous heat source.

In embodiments in which the aerosol-forming substrate is downstream of the combustible carbonaceous heat source, the thermal indicator may be provided on an outer surface of the aerosol-generating article overlying the aerosol-forming substrate In embodiments in which the combustible carbonaceous heat source is a blind combustible heat source and the aerosol-forming substrate is downstream of the blind combustible carbonaceous heat source, advantageously aerosol-generating articles according to the invention comprise one or more air inlets around the periphery of the aerosol-forming substrate. More advantageously, in such embodiments aerosol-generating articles according to the invention comprise one or more air inlets located proximate to the downstream end of the aerosol-forming substrate.

Advantageously, in embodiments in which the aerosol-forming substrate is downstream of the combustible carbonaceous heat source, the thermal indicator is provided on an outer surface of the aerosol-generating article downstream of the aerosol-forming substrate.

The aerosol-forming substrate may be a solid aerosol-forming substrate. The solid aerosol-forming substrate may comprise, for example, one or more of: powder, granules, pellets, shreds, spaghetti strands, strips or sheets of material capable of releasing volatile compounds in response to heating. The solid aerosol-forming substrate may be in loose form, or may be provided in a suitable container or cartridge.

The aerosol-forming substrate may comprise both solid and liquid components.

Advantageously, the aerosol-forming substrate comprises nicotine. More advantageously, the aerosol-forming substrate comprises tobacco.

Aerosol-generating articles according to the invention advantageously comprise an aerosol-forming substrate comprising at least one aerosol-former and a material capable of releasing volatile compounds in response to heating. The aerosol-forming substrate may comprise other additives and ingredients including, but not limited to, humectants, flavourants, binders and mixtures thereof.

The at least one aerosol-former may be any suitable known compound or mixture of compounds that, in use, facilitates formation of a dense and stable aerosol and that is substantially resistant to thermal degradation at the operating temperature of the aerosol-generating article. Suitable aerosol-formers are well known in the art and include, for example, polyhydric alcohols, esters of polyhydric alcohols, such as glycerol mono-, di- or triacetate, and aliphatic esters of mono-, di- or polycarboxylic acids, such as dimethyl dodecanedioate and dimethyl tetradecanedioate. Preferred aerosol formers for use in aerosol-generating articles according to the invention are polyhydric alcohols or mixtures thereof, such as triethylene glycol, 1,3-butanediol and, most preferred, glycerine.

The material capable of emitting volatile compounds in response to heating may be a charge of plant-based material. The material capable of emitting volatile compounds in response to heating may be a charge of homogenised plant-based material. For example, the aerosol-forming substrate may comprise one or more materials derived from plants including, but not limited to: tobacco; tea, for example green tea; peppermint; laurel; *Eucalyptus*; basil; sage; *Verbena*; and tarragon.

Advantageously, the material capable of emitting volatile compounds in response to heating is a charge of tobacco-based material, most advantageously a charge of homogenised tobacco-based material.

The aerosol-forming substrate may be in the form of a plug or segment comprising a material capable of emitting volatile compounds in response to heating circumscribed by an outer wrapper of paper or other material. As stated above, where an aerosol-forming substrate is in the form of such a plug or segment, the entire plug or segment including any outer wrapper is considered to be the aerosol-forming substrate.

Advantageously, the aerosol-forming substrate may comprise a plug of tobacco-based material wrapped in a plug wrap. More advantageously, the aerosol-forming substrate may comprise a plug of homogenised tobacco-based material wrapped in a plug wrap.

Advantageously, the aerosol-forming substrate has a length of between about 5 millimetres and about 20 millimetres more advantageously of between about 6 millimetres and about 15 millimetres most advantageously of between about 7 millimetres and about 12 millimetres.

Preferably, smoking articles according to the invention further comprise one or more heat-conducting elements around at least a rear portion of the combustible carbonaceous heat source and at least a front portion of the aerosol-forming substrate.

In embodiments in which the aerosol-forming substrate is downstream of the combustible carbonaceous heat source, aerosol-generating articles according to the invention may advantageously comprise a heat-conducting element around and in direct contact with both at least a rear portion of the combustible carbonaceous heat source and at least a front portion of the aerosol-forming substrate. In such embodiments, the heat-conducting element provides a thermal link between the combustible carbonaceous heat source and the aerosol-forming substrate and advantageously helps to facilitate adequate heat transfer from the combustible carbonaceous heat source to the aerosol-forming substrate to provide an acceptable aerosol.

Aerosol-generating articles according to the invention may comprise a heat-conducting element spaced apart from one or both of the combustible carbonaceous heat source and the aerosol-forming substrate, such that there is no direct contact between the heat-conducting element and one or both of the combustible carbonaceous heat source and the aerosol-forming substrate.

Advantageously, the one or more heat-conducting elements are non-combustible.

The one or more heat conducting elements may be oxygen restricting. In other words, the one or more heat-conducting elements may inhibit or resist the passage of oxygen through the heat-conducting element.

Suitable heat-conducting elements for use in aerosol-generating articles according to the invention include, but are not limited to: metal foil wrappers such as, for example, aluminium foil wrappers, steel wrappers, iron foil wrappers and copper foil wrappers; and metal alloy foil wrappers.

In embodiments in which the aerosol-forming substrate is downstream of the combustible carbonaceous heat source, aerosol-generating articles according to the invention may advantageously further comprise a non-combustible substantially air impermeable barrier between the rear end face of the combustible carbonaceous heat source and the aerosol-forming substrate.

As used herein with reference to the invention, the term "non-combustible" is used to describe a barrier that is substantially non-combustible at temperatures reached by the combustible carbonaceous heat source during combustion and ignition thereof.

The barrier may abut one or both of the rear end face of the combustible carbonaceous heat source and the aerosol-forming substrate. Alternatively, the barrier may be spaced apart from one or both of the rear end face of the combustible carbonaceous heat source and the aerosol-forming substrate.

As used herein with reference to the invention, the term "abut" is used to describe a component, or portion of a component, being in direct contact with another component, or portion of a component.

The barrier may be adhered or otherwise affixed to one or both of the rear end face of the combustible carbonaceous heat source and the aerosol-forming substrate.

Advantageously, the barrier comprises a non-combustible substantially air impermeable barrier coating provided on the rear end face of the combustible carbonaceous heat source. In such embodiments, advantageously the barrier comprises a barrier coating provided on at least substantially the entire rear end face of the combustible carbonaceous heat source. More advantageously, the barrier comprises a barrier coating provided on the entire rear end face of the combustible carbonaceous heat source.

Aerosol-generating articles according to the invention may further comprise a cap configured to at least partially cover the front end face of the combustible carbonaceous heat source, wherein the cap is removable to expose the front end face of the combustible carbonaceous heat source prior to ignition of the combustible carbonaceous heat source.

Advantageously, the cap protects the combustible carbonaceous heat source prior to use of the aerosol-generating article.

As used herein with reference to the invention, the term "cap" is used to describe a protective cover that substantially surrounds the distal end of the aerosol-generating article, including the front end face of the combustible carbonaceous heat source.

For example, aerosol-generating articles according to the invention may comprise a removable cap attached at a line of weakness to the distal end of the aerosol-generating, wherein the cap comprises a cylindrical plug of material circumscribed by a wrapper as described in WO-A1-2014/086998.

Aerosol-generating articles according to the invention advantageously further comprise a mouthpiece located at the proximal end thereof.

Advantageously, the mouthpiece is of low filtration efficiency, more advantageously of very low filtration efficiency.

The mouthpiece may be a single segment or component mouthpiece.

The mouthpiece may be a multi-segment or multi-component mouthpiece.

The mouthpiece may comprise a filter comprising one or more segments comprising suitable known filtration materials. Suitable filtration materials are known in the art and include, but are not limited to, cellulose acetate and paper.

The mouthpiece may comprise one or more segments comprising absorbents, adsorbents, flavourants, and other aerosol modifiers and additives or combinations thereof.

Aerosol-generating articles according to the invention may advantageously comprise a transfer element between the aerosol-forming substrate and the mouthpiece.

The transfer element may abut one or both of the aerosol-forming substrate and the mouthpiece. Alternatively, the transfer element may be spaced apart from one or both of the aerosol-forming substrate and the mouthpiece.

The inclusion of a transfer element advantageously allows cooling of the aerosol generated by heat transfer from the combustible carbonaceous heat source to the aerosol-forming substrate.

The inclusion of a transfer element also advantageously allows the overall length of the aerosol-generating article to be adjusted to a desired value, for example to a length similar to that of a conventional cigarette, through an appropriate choice of the length of the transfer element.

The transfer element may have a length of between about 7 millimetres and about 50 millimetres, for example a length of between about 10 millimetres and about 45 millimetres or of between about 15 millimetres and about 30 millimetres. The transfer element may have other lengths depending upon the desired overall length of the aerosol-generating article, and the presence and length of other components within the aerosol-generating.

Advantageously, the transfer element comprises at least one open-ended tubular hollow body. In such embodiments, in use, air drawn into the aerosol-generating article passes through the at least one open-ended tubular hollow body as it passes downstream through the aerosol-generating article from the aerosol-forming substrate to the mouthpiece.

The transfer element may comprise at least one open-ended tubular hollow body formed from one or more suitable materials that are substantially thermally stable at the temperature of the aerosol generated by the transfer of heat from the combustible carbonaceous heat source to the aerosol-forming substrate. Suitable materials are known in the art and include, but are not limited to, paper, cardboard, plastics, such a cellulose acetate, ceramics and combinations thereof.

Aerosol-generating articles according to the invention may advantageously comprise an aerosol-cooling element between the aerosol-forming substrate and the mouthpiece. The aerosol-cooling element may comprise a plurality of longitudinally extending channels.

The aerosol-cooling element may comprise a gathered sheet of material selected from the group consisting of metallic foil, polymeric material, and substantially non-porous paper or cardboard.

The aerosol-cooling element may comprise a gathered sheet of material selected from the group consisting of polyethylene (PE), polypropylene (PP), polyvinylchloride (PVC), polyethylene terephthalate (PET), polylactic acid (PLA), cellulose acetate (CA), and aluminium foil.

Advantageously, the aerosol-cooling element may comprise a gathered sheet of biodegradable polymeric material, such as polylactic acid (PLA) or a grade of Mater-Bi® (a commercially available family of starch based copolyesters).

Aerosol-generating articles according to the invention may have any desired length. For example, aerosol-generating articles according to the invention may have a total length of between about 65 millimetres and about 100 millimetres.

Aerosol-generating articles according to the invention may simulate smoking articles, such as for example, combustible lit-end cigarettes.

Aerosol-generating articles according to the invention may have any desired width. For example, aerosol-generating articles according to the invention may have a width of between about 5 millimetres and about 12 millimetres.

In embodiments in which the aerosol-forming substrate is downstream of the combustible carbonaceous heat source, aerosol-generating articles according to the invention advantageously comprise an outer wrapper that circumscribes the aerosol-forming substrate and at least a rear portion of the combustible carbonaceous heat source. The outer wrapper should grip the combustible carbonaceous heat source and the aerosol-forming substrate of the aerosol-generating article when the aerosol-generating article is assembled.

In embodiments in which the aerosol-forming substrate is downstream of the combustible carbonaceous heat source, aerosol-generating articles according to the invention more advantageously comprise an outer wrapper that circumscribes the aerosol-forming substrate, at least a rear portion of the combustible carbonaceous heat source and any other components of the aerosol-generating article downstream of the aerosol-forming substrate.

Aerosol-generating articles according to the invention may comprise outer wrappers formed from any suitable material or combination of materials. Suitable materials are well known in the art and include, but are not limited to, cigarette paper.

Aerosol-generating articles according to the invention may be assembled using known methods and machinery.

For the avoidance of doubt, features described above in relation to one aspect of the invention may also be applicable to other aspects of the invention. In particular, features described above in relation to aerosol-generating articles according to the invention may also relate, where appropriate, to methods according to the invention, and vice versa.

The invention will be further described, by way of example only, with reference to the accompanying drawings in which.

Figure 1:
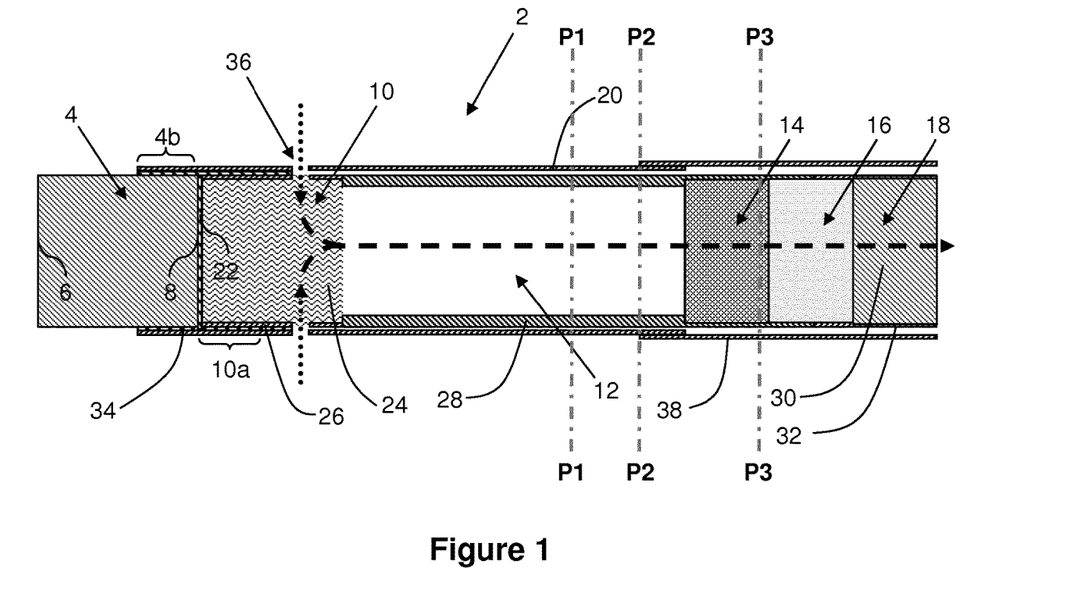
FIG. 1 shows a schematic longitudinal cross-section of an aerosol-generating article according to an embodiment of the invention.

The aerosol-generating 2 according to the invention shown in FIG. 1 comprises a combustible carbonaceous heat source 4 having a front end face 6 and an opposed rear end face 8, an aerosol-forming substrate 10, a transfer element 12, an aerosol-cooling element 14, a spacer element 16 and a mouthpiece 18 in abutting coaxial alignment. As shown in FIG. 1, the aerosol-forming substrate 10, transfer element 12 and a rear portion of the blind combustible heat source 4 are wrapped in a co-laminated outer wrapper 20. The co-laminated outer wrapper 20 comprises an inner layer of paper and an outer layer of aluminium foil (not shown).

The combustible carbonaceous heat source 4 is a cylindrical blind carbonaceous combustible heat source and is located at the distal end of the aerosol-generating article 2. As shown in FIG. 1, a non-combustible substantially air impermeable barrier 22 in the form of a disc of aluminium foil is provided between the rear end face 8 of the combustible carbonaceous heat source 4 and the aerosol-forming substrate 10. The barrier 22 is applied to the rear end face 8 of the combustible carbonaceous heat source 4 by pressing the disc of aluminium foil onto the rear end face 8 of the combustible carbonaceous heat source 4 and abuts the rear end face 8 of the combustible carbonaceous heat source 4 and the aerosol-forming substrate 10.

The aerosol-forming substrate 10 is located immediately downstream of the barrier 22 applied to the rear end face 8 of the combustible carbonaceous heat source 4. The aerosol-forming substrate 10 comprises a cylindrical plug of homogenised tobacco-based material 24 including glycerine as an aerosol former wrapped in plug wrap 26.

The transfer element 12 is located immediately downstream of the aerosol-forming substrate 10 and comprises a cylindrical open-ended hollow cellulose acetate tube 28.

The aerosol-cooling element 14 is located immediately downstream of the transfer element 12 and comprises a gathered sheet of biodegradable polymeric material such as, for example, polylactic acid.

The spacer element 16 is located immediately downstream of the aerosol-cooling element 14 and comprises a cylindrical open-ended hollow paper or cardboard tube.

The mouthpiece 18 is located immediately downstream of the spacer element 16. As shown in FIG. 1, the mouthpiece 18 is located at the proximal end of the aerosol-generating article 2 and comprises a cylindrical plug of suitable filtration material 30 such as, for example, cellulose acetate tow of very low filtration efficiency, wrapped in filter plug wrap.

The aerosol-generating article 2 further comprises a band of tipping paper 38 that circumscribes the mouthpiece 18, aerosol-cooling element 14, the spacer element 16 and a downstream end portion of the outer wrapper 20 overlying the transfer element 12.

As shown in FIG. 1, the aerosol-generating article 2 further comprises a heat-conducting element 34 of aluminium foil around and in direct contact with a rear portion 4b of the blind combustible heat source 4 and a front portion 10a of the aerosol-forming substrate 10.

The aerosol-generating article 2 according to the invention shown in FIG. 1 comprises one or more first air inlets 36 around the periphery of the aerosol-forming substrate 10. As shown in FIG. 1, a circumferential arrangement of first air inlets 36 is provided in the plug wrap 26 of the aerosol-forming substrate 10 and the overlying outer wrapper 20 to admit cool air (shown by dotted arrows in FIG. 1) into the aerosol-forming substrate 10.

A thermal indicator is provided on the outer surface of the aerosol-generating article 2 downstream of the combustible carbonaceous heat source. The thermal indicator comprises a ring of reversible thermochromic ink that circumscribes the aerosol-generating article at, for example, position P1, P2 or P3. The ring of reversible thermochromic ink may be applied directly to the outer wrapper 20 of the aerosol-generating article 2 at position P1 or applied directly to the band of tipping paper 38 of the aerosol-generating article 2 at position P2 or P3. Alternatively, the ring of reversible thermochromic ink may be applied to a band of paper (not shown) that circumscribes the outer wrapper 20 at position P1 or that circumscribes the band of tipping paper 38 at position P2 or P3.

The reversible thermochromic ink comprises a leuco dye that undergoes a first reversible visible colour change from blue to colourless when the temperature of the thermal indicator rises to a first switching temperature below 50° C. and a second reversible visible colour change from colourless to blue when the temperature of the thermal indicator falls to a second switching temperature lower than the first switching temperature.

In use, a user ignites the combustible carbonaceous heat source 4. Once the combustible carbonaceous heat source 4 is ignited the user draws on the mouthpiece 18 of the aerosol-generating article 2. When a user draws on the mouthpiece 18, cool air (shown by dotted arrows in FIG. 1) is drawn into the aerosol-forming substrate 10 of the aerosol-generating article 2 through the first air inlets 36.

The front portion 10a of the aerosol-forming substrate 10 is heated by conduction through the rear end face 8 of the combustible carbonaceous heat source 4 and the barrier 22 and the heat-conducting element 34. Following ignition of the combustible heat source 4, the temperature of the aerosol-generating article 2 begins to increase. When the temperature of the thermal indicator rises to the first switching temperature, the leuco dye in the ring of reversible thermochromic ink undergoes a first reversible visible colour change from blue to colourless and the ring 'disappears'. This provides the user with a visual indication that the temperature of the combustible carbonaceous heat source 4 of the aerosol-generating article 2 is too high for the aerosol-generating article 2 to be disposed of.

The heating of the aerosol-forming substrate 10 by conduction releases glycerine and other volatile and semi-volatile compounds from the plug of homogenised tobacco-based material 24. The compounds released from the aerosol-forming substrate 10 form an aerosol that is entrained in the air drawn into the aerosol-forming substrate 10 of the aerosol-generating article 2 through the first air inlets 36 as it flows through the aerosol-forming substrate 10. The drawn air and entrained aerosol (shown by dashed arrows in FIG. 1) pass downstream through the interior of the cylindrical open-ended hollow cellulose acetate tube 28 of the transfer element 12, the aerosol-cooling element 14 and the spacer element 16, where they cool and condense. The cooled drawn air and entrained aerosol pass downstream through the mouthpiece 18 and are delivered to the user through the proximal end of the aerosol-generating article 2. The non-combustible substantially air impermeable barrier 22 on the rear end face 8 of the combustible carbonaceous heat source 4 isolates the combustible carbonaceous heat source 4 from air drawn through the aerosol-generating article 2 such that, in use, air drawn through the aerosol-generating article 2 does not come into direct contact with the combustible carbonaceous heat source 4.

After use of the aerosol-generating article 2, the user extinguishes the combustible heat source 4 of the aerosol-generating article 2.

Once the combustible carbonaceous heat source 4 has been extinguished, the temperature of the aerosol-generating article 2 begins to decrease. When the temperature of the thermal indicator falls to the second switching temperature, the leuco dye in the ring of reversible thermochromic ink undergoes a second reversible visible colour change from colourless to blue and the ring 'reappears'. This provides the user with a visual indication that the combustible carbonaceous heat source 4 of the aerosol-generating article 2 has cooled to a sufficiently low temperature for the aerosol-generating article 2 to be disposed of.

EXAMPLES

Examples of aerosol-generating articles according to the embodiment of the invention shown in FIG. 1 are assembled having the dimensions shown in Table 1. The thermal indicators of the aerosol-generating articles of the three Examples comprise different reversible thermochromic inks supplied by Thermographic Measurements Ltd in Honiton, Devon, England. Each of the different reversible thermochromic inks undergoes a first reversible visible colour change from blue to colourless when the temperature of the thermal indicator rises to the respective first switching temperature shown in Table 1 and a second reversible visible colour change from colourless to blue when the temperature of the thermal indicator falls to the respective second switching temperature shown in Table 1. In each Example, a ring of the reversible thermochromic ink is applied to a band of paper having a length of 10 mm that is adhered to the surface of the aerosol-generating article at the respective position shown in Table 1.

The combustible heat sources of three aerosol-generating articles for each Example are ignited and the aerosol-generating articles smoked using a smoking machine under a Health Canada smoking regime with an additional cooling time (without puffing) for a total experimental time of about 1000 seconds. In each Example, after 8 minutes (480 seconds) the temperature of the front end face of the combustible heat source of the aerosol-generating article is below about 300° C. In each example, after 10 minutes (600 seconds) the temperature of the front end face of the combustible heat source of the aerosol-generating article is below about 50° C.

Figure 2:
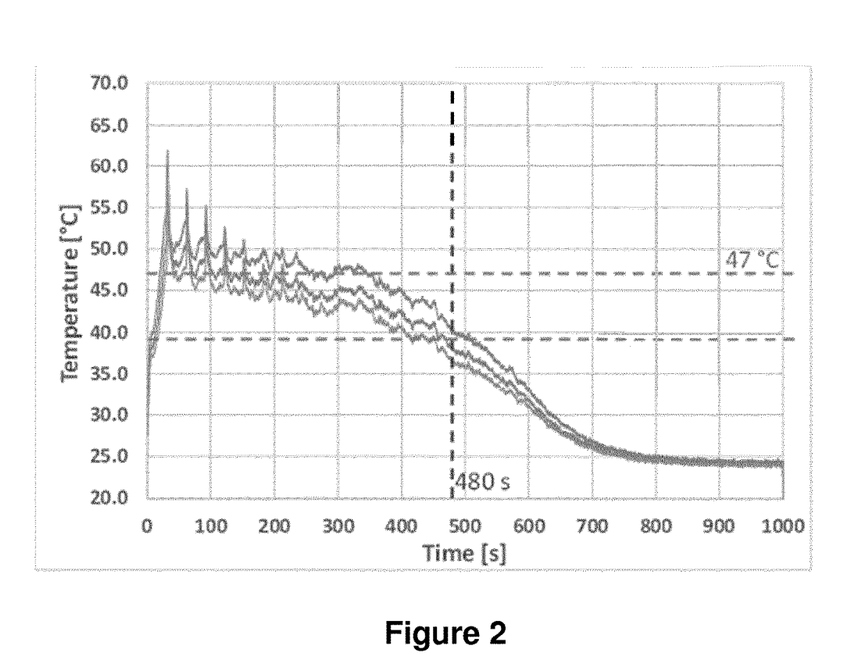

The surface temperature of the aerosol-generating articles at the location of the thermal indicators during the experiment is measured using an infrared (IR) camera. The results for the three aerosol-generating articles of Example 1 are shown in FIG. 2.

In each Example, there is complete 'disappearance' of the ring of reversible thermochromic ink after the first puff and there is no 'reappearance' of the ring of reversible thermochromic ink between puffs. As shown in FIG. 1 and Table 2, in Examples 1 and 2 'reappearance' of the ring of reversible thermochromic ink upon cooling of the aerosol-generating articles advantageously provides a visual indication to a user that the temperature of the front end face of the combustible carbonaceous heat source of the aerosol-generating article is below about 300° C. As shown in Table 1, in Example 3 'reappearance' of the ring of reversible thermochromic ink upon cooling of the aerosol-generating articles advantageously provides a visual indication to a user that the temperature of the front end face of the combustible carbonaceous heat source of the aerosol-generating article is below about 50° C.

TABLE 1

| Example | 1 | 2 | 3 |
|---|---|---|---|
| Aerosol-generating article | | | |
| Overall length (millimetres) | | 79 | |
| Diameter (millimetres) | | 7.8 | |
| Combustible carbonaceous heat source | | | |
| Length (millimetres) | | 9 | |
| Aerosol-forming substrate | | | |
| Length (millimetres) | | 8 | |
| Aerosol former | | Glycerine | |
| Transfer element | | | |
| Length (millimetres) | | 26 | |
| Aerosol-cooling element | | | |
| Length (millimetres) | | 12 | |
| Spacer element | | | |
| Length (millimetres) | | 12 | |
| Mouthpiece | | | |
| Length (millimetres) | | 12 | |
| Tipping paper | | | |
| Length (millimetres) | | 41 | |
| Air inlets | | | |
| Distance from rear end face of combustible carbonaceous heat source (millimetres) | | 7 | |
| Thermal indicator | | | |
| Position | P1 | P2 | P3 |
| Distance from rear end face of combustible carbonaceous heat source (millimetres) | 19 | 29 | 34 |
| First switching temperature (° C.) | 47 | 37 | 31 |
| Second switching temperature (° C.) | 39 | 28 | 26 |
| Time to 'disappearance' (seconds) | 28-30 | 58 ± 2 | 47 ± 3 |
| Time to 'reappearance' (seconds) | 508-557 | 510 ± 50 | 660 ± 40 |

The invention claimed is:

1. An aerosol-generating article, comprising:
a combustible carbonaceous heat source;
an aerosol-forming substrate; and
a thermal indicator provided on an outer surface of the aerosol-generating article downstream of the combustible carbonaceous heat source,
the thermal indicator comprising at least one reversible thermochromic material that undergoes a first reversible visible colour change when a temperature of the thermal indicator rises to a first switching temperature following ignition of the combustible heat source, the first switching temperature being below about 80° C.,
wherein the thermal indicator undergoes a second reversible visible colour change when a temperature of the thermal indicator falls to a second switching temperature once the combustible carbonaceous heat source has been extinguished, the second switching temperature being lower than or equal to the first switching temperature, and
wherein a position of the thermal indicator and the second switching temperature are such that the second reversible visible colour change of the at least one thermochromic material provides a visual indication to the user that a temperature of a front end face of the combustible carbonaceous heat source is below about 300° C. and therefore that the combustible carbonaceous heat source is sufficiently cool for the aerosol-generating article to be disposed of.

2. The aerosol-generating article according to claim 1, wherein the first switching temperature is between about 30° C. and about 80° C.

3. The aerosol-generating article according to claim 2, wherein the first switching temperature is between about 30° C. and about 60° C.

4. The aerosol-generating article according to claim 1, wherein the second switching temperature is between about 3° C. and about 15° C. lower than the first switching temperature.

5. The aerosol-generating article according to claim 4, wherein the second switching temperature is between about 5° C. and about 12° C. lower than the first switching temperature.

6. The aerosol-generating article according to claim 1, wherein the at least one reversible thermochromic material undergoes the first reversible visible colour change from a coloured state to a substantially colourless state when the temperature of the thermal indicator rises to the first switching temperature and undergoes the second reversible visible colour change from the substantially colourless state to the coloured state when the temperature of the thermal indicator falls to the second switching temperature.

7. The aerosol-generating article according to claim 1, wherein the at least one reversible thermochromic material comprises a leuco dye.

8. The aerosol-generating article according to claim 1, wherein the thermal indicator further comprises at least one non-thermochromic coloured material.

9. The aerosol-generating article according to claim 1, wherein the aerosol-forming substrate is downstream of the combustible carbonaceous heat source and the thermal indicator is provided on an outer surface of the aerosol-generating article downstream of the aerosol-forming substrate.

10. The aerosol-generating article according to claim 1, wherein the thermal indicator is at least about 15 millimetres downstream of the combustible carbonaceous heat source.

11. The aerosol-generating article according to claim 1, wherein the thermal indicator is between about 15 millimetres and about 45 millimetres downstream of the combustible carbonaceous heat source.

12. The aerosol-generating article according to claim 1, wherein the second switching temperature is lower than the first switching temperature.

* * * * *